Jan. 19, 1932. G. F. HENRY 1,842,171
MECHANICAL VENTILATING SYSTEM FOR MOTOR VEHICLES
Filed Aug. 9, 1930 6 Sheets-Sheet 1
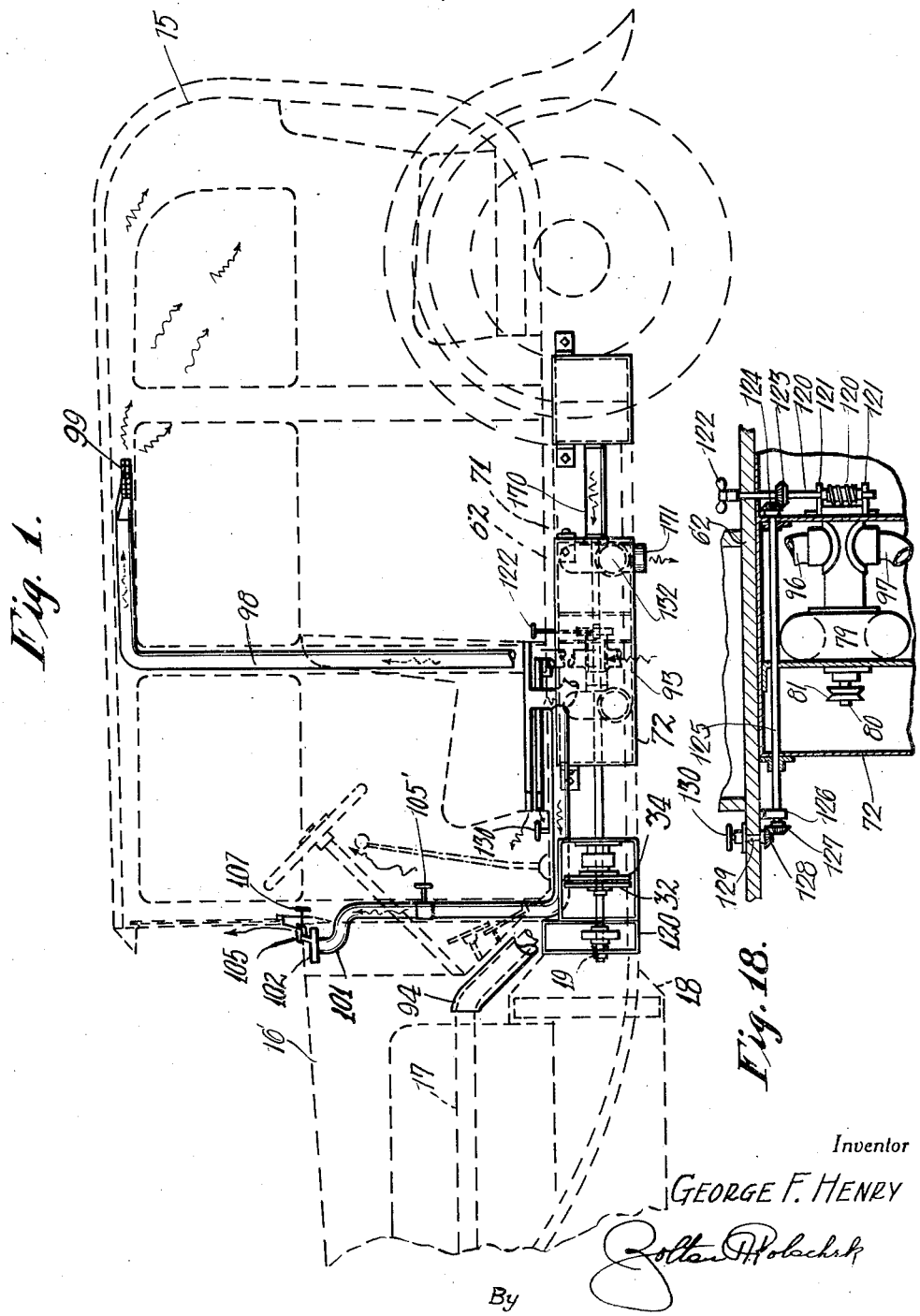
Inventor
GEORGE F. HENRY
By
Attorney

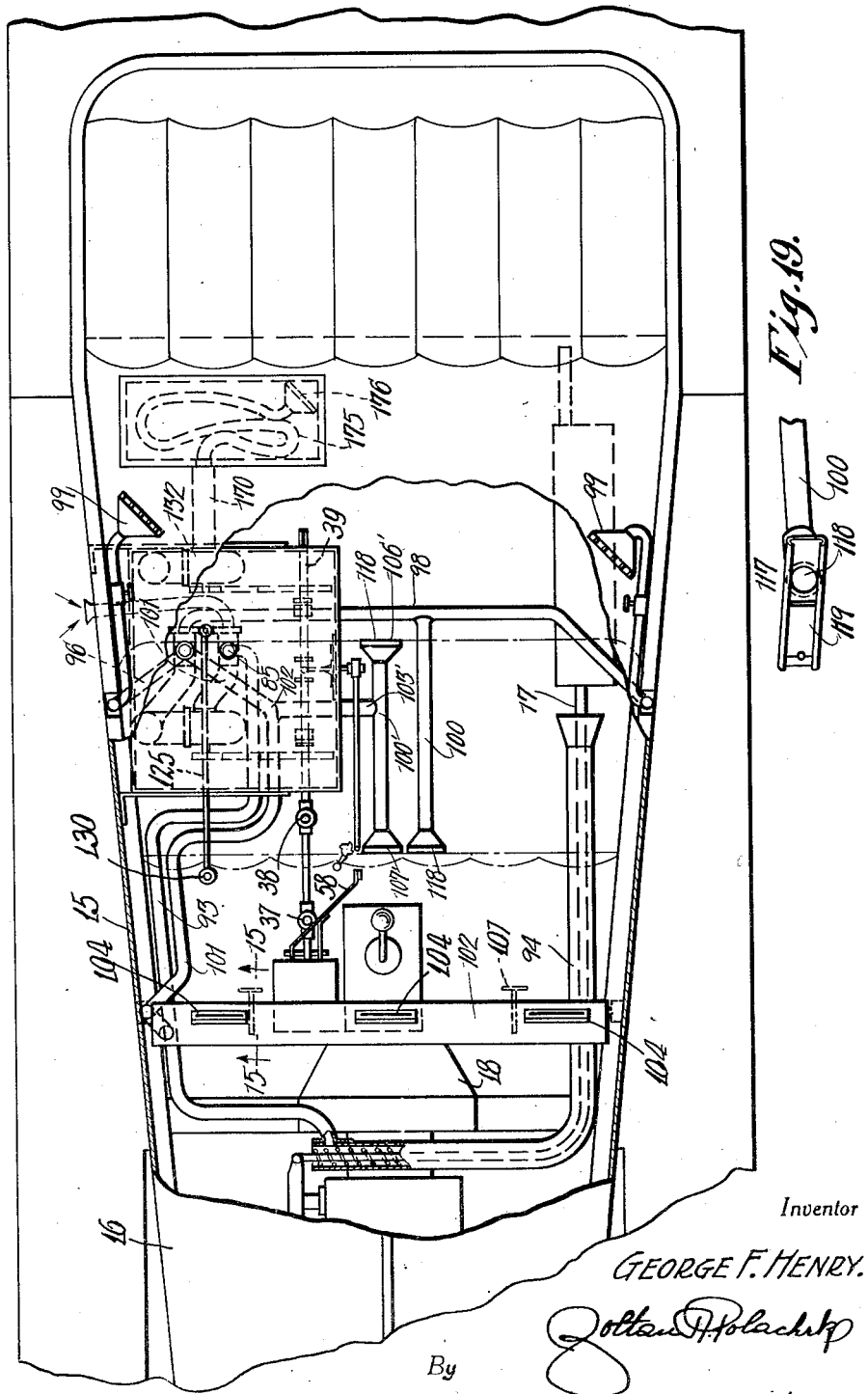

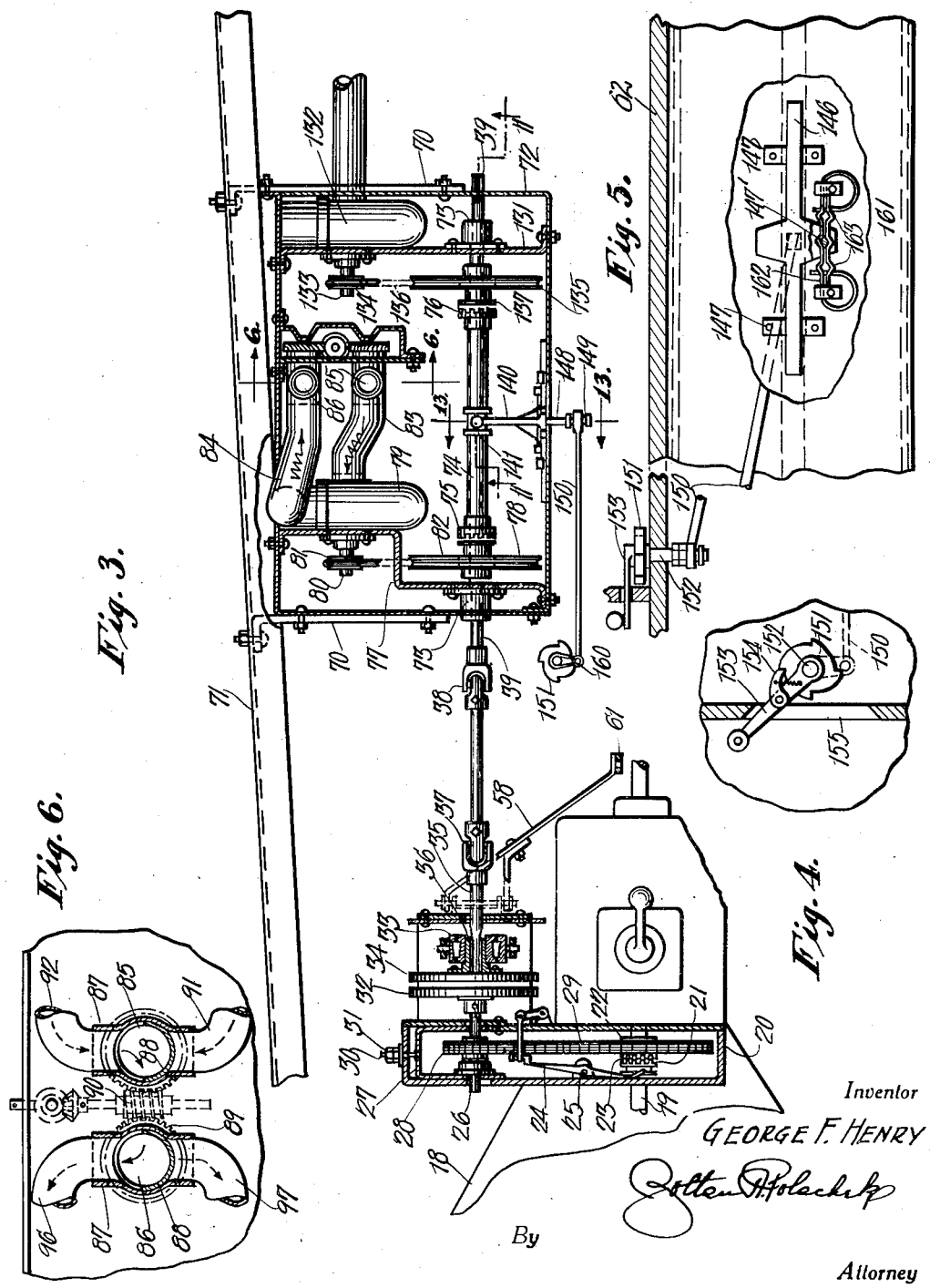

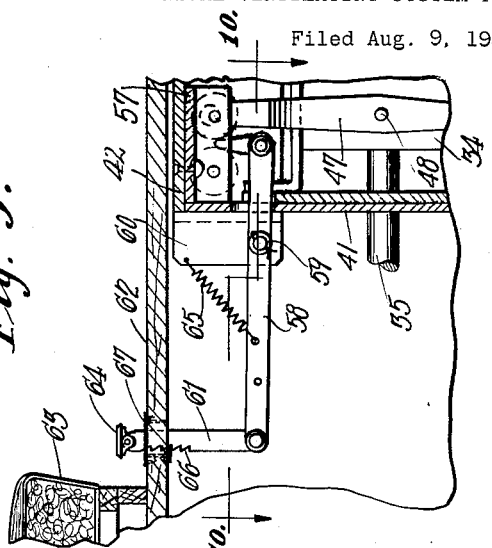

Jan. 19, 1932.  G. F. HENRY  1,842,171
MECHANICAL VENTILATING SYSTEM FOR MOTOR VEHICLES
Filed Aug. 9, 1930  6 Sheets-Sheet 5
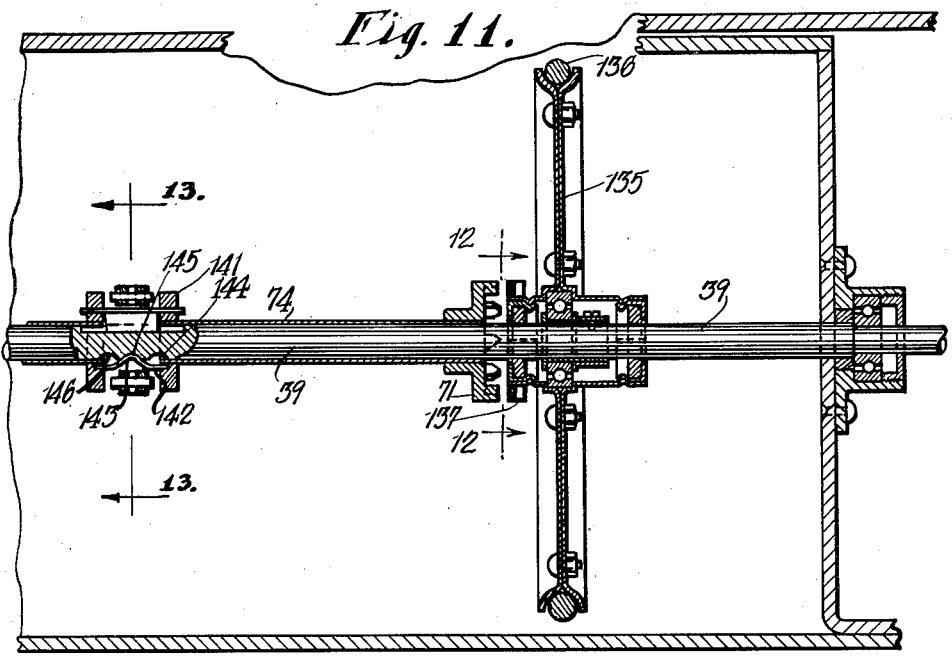
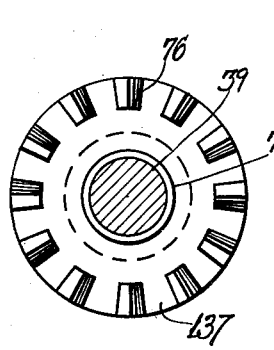
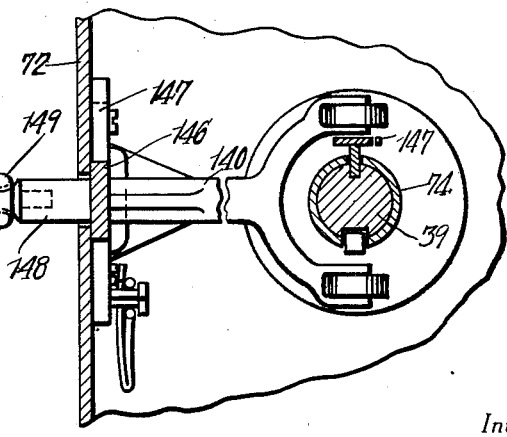
Inventor
GEORGE F. HENRY
By
Attorney Jan. 19, 1932.     G. F. HENRY     1,842,171
MECHANICAL VENTILATING SYSTEM FOR MOTOR VEHICLES
Filed Aug. 9, 1930     6 Sheets-Sheet 6
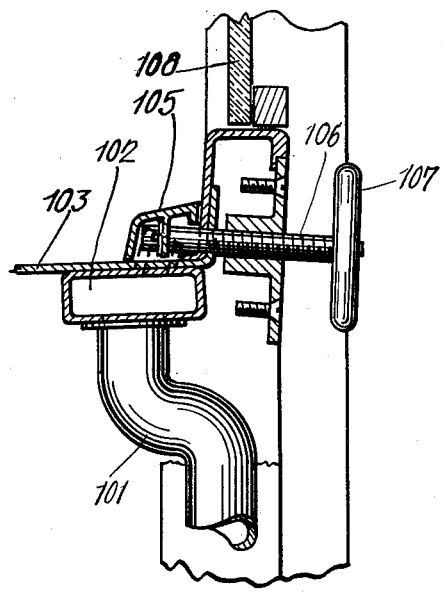
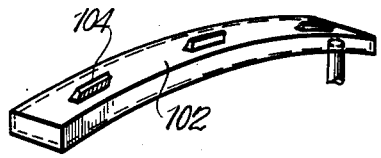
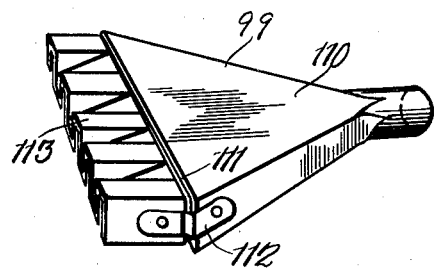
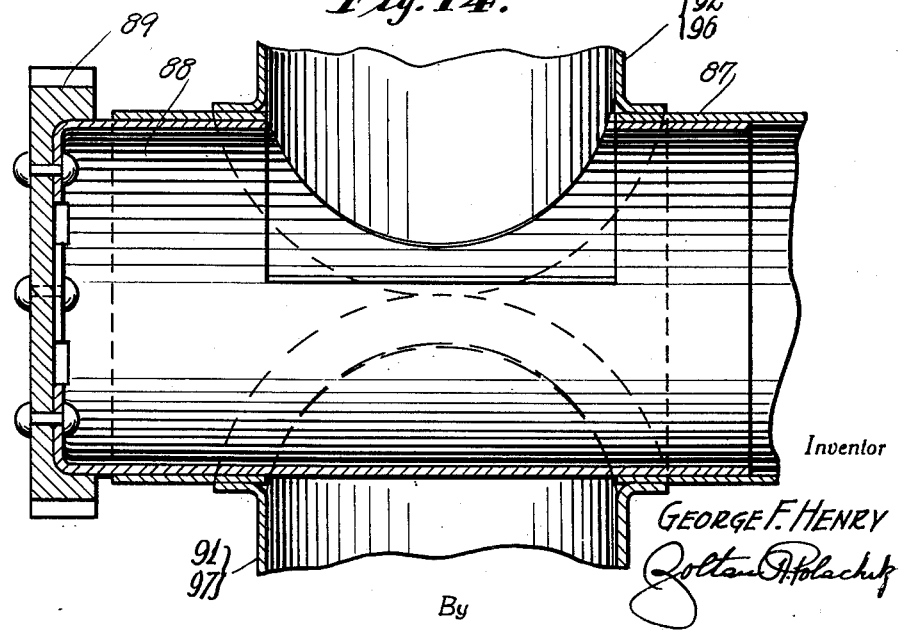
Inventor
GEORGE F. HENRY
By
Attorney Patented Jan. 19, 1932

1,842,171

UNITED STATES PATENT OFFICE

GEORGE F. HENRY, OF CORONA, NEW YORK

MECHANICAL VENTILATING SYSTEM FOR MOTOR VEHICLES

Application filed August 9, 1930. Serial No. 474,257.

This invention relates to new and useful improvements in motor vehicles, and more particularly it pertains to means for ventilating the interior of motor vehicles such for example as taxi-cabs, limousines and the like.

While the invention is herein disclosed as applied to a motor vehicle of the automobile type, it is to be understood that it may be applied to other types of vehicles and that certain principles of the invention are readily applicable to vehicles such as railway cars and in fact any type of passenger carrying vehicle.

When vehicles are in motion, it is possible to obtain a natural draft therethrough by opening windows or in fact with the windows closed and through suitable ventilating openings. In warm weather however such vehicles become unbearably uncomfortable when not in motion, and it is an object of the present invention to provide a new and novel means whereby closed vehicles may be effectively ventilated when not in motion.

It is a further object of the invention to provide mechanically operated ventilating means for providing a forced draft or circulation of air through a closed vehicle when the same is standing, which means will be manually thrown into operation when the vehicle is standing, and which will also be manually thrown out of operation when the vehicle starts to move.

It is a further object of the invention to provide a plurality of mechanically driven blowers or fans, and to so arrange said blowers or fans and their driving mechanism, that they may be operated or driven by the motor of the vehicle, particularly when used in passenger vehicles of the automobile type.

Another object of the invention is the provision of means including one of previously mentioned fans for drawing air from the interior of the vehicle and discharging it to the exterior for providing suction in the interior which may be used for vacuum cleaning.

It is a further object of the invention to provide a device of the aforementioned type in which the interior of the vehicle may be supplied with cool air in warm weather, and with heated air in cool weather, thus providing a combined ventilating and heating device for closed vehicles.

A feature of the invention resides in optional means for directing a current of heated air against the windshield of the vehicle to keep it clear during periods of rain or snow.

A further feature of the invention resides in the provision of means whereby the air circulating means may be supplied with cool air from the exterior of the vehicle, or with heated air from the region of the motor of the vehicle together with means for controlling the supply of cool or heated air.

A further feature of the invention resides in a novel mechanism for operating the means which produces the air circulation, and in accordance with such practices, this means is intermittently operated, and a still further feature of the invention resides in means whereby the intermittent operation of the air circulation means may be obtained.

Certain other features of the invention relate to operating means under the control of the driver whereby the air or draft impelling means may be operated at the will of the driver. In the present construction, such means consists of a foot pedal or lever located closely to the driver's seat, and operated by the driver's foot to connect and disconnect the operating means.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed descriptions of the constructions therein shown.

In the accompanying drawings, forming a material part of this disclosure:—

Fig. 1 is a view in side elevation showing the outline of the body of a motor vehicle of the closed type in broken lines, the salient features of the device constructed in accordance with the present invention being illustrated in side elevation.

Fig. 2 is a horizontal sectional view taken through the body of the vehicle.

Fig. 3 is an enlarged view partly in plan and partly in section illustrating a device constructed in accordance with the present invention.

Fig. 4 is a detail sectional view of the manually operated portion of the mechanical drive control.

Fig. 5 is a view partly in elevation and partly in section of a portion of the manually operated controlling means of the operating mechanism.

Fig. 6 is a detail sectional view taken on the line 6—6 of Fig. 3.

Fig. 7 is a sectional view taken on an enlarged scale showing a clutch mechanism employed in connection with the device of the present invention.

Fig. 8 is a detail sectional view taken on the line 8—8 of Fig. 7.

Fig. 9 is a detail sectional view taken upon the line 9—9 of Fig. 8.

Fig. 10 is a detail sectional view taken upon the line 10—10 of Fig. 9.

Fig. 11 is a detail sectional view on an enlarged scale taken on the line 11—11 of Fig. 3.

Fig. 12 is a detail sectional view taken on the line 12—12 of Fig. 11.

Fig. 13 is a detail sectional view taken on the line 13—13 of Figs. 3 and 11.

Fig. 14 is a sectional view taken on an enlarged scale of the air or draft flow controlling valves.

Fig. 15 is a detail sectional view taken approximately on the line 15—15 of Fig. 2.

Fig. 16 is a perspective view of the discharge device which is located adjacent the windshield of the vehicle.

Fig. 17 is a perspective view of one of the discharge nozzles employed in connection with the present device.

Fig. 18 is a detail fragmentary sectional view illustrating an air control mechanism and its operating means.

Fig. 19 is a detail perspective view showing a discharge control for the air circulation.

Referring specifically to the drawings, the reference numeral 15 designates the body of a closed automobile or similar vehicle, 16 the hood thereof, and 17 designates the exhaust pipe of the motor of the vehicle. 18 designates the rear end of the clutch housing, and 19 designates the rear end of the clutch shaft.

As more clearly illustrated in Fig. 3, the clutch shaft 19 projects to the interior of a frame 20 and said clutch shaft is provided with a clutch face 21. Loosely mounted upon the shaft 19 which extends through the frame 20, there is a sprocket wheel 22, and said sprocket wheel is provided with a clutch face 23 with which the clutch face 21 is adapted to engage to drive the sprocket wheel 22, it being understood of course, that the clutch face 21 will be keyed splined or otherwise operatively connected with the shaft 19. The clutch face 21 is moved into and out of engagement with the clutch face 23 to drive the sprocket 22 by means of a rocking lever 24 pivotally mounted as at 25 in the frame 20 and operated in a manner to be hereinafter described.

Mounted within the frame 20, and carried by a sliding frame 27, there is a shaft 26, and this shaft 26 carries a sprocket 28 within the frame 20, and passing therearound and around the sprocket 22 heretofore mentioned, there is a silent chain 29. By this means, when the sprocket 22 is driven, the shaft 26 will likewise be driven through the medium of the silent chain 29. The frame 27 is provided with a screw threaded projecting member 30 which projects through one of the walls of the housing, and is adapted to receive a plurality of nuts 31. By this means the frame 27 is adjustable in the housing 20 to properly position the shaft 26 therein. Mounted to the rear of the housing 20 on the shaft 26 therein, there is a friction clutch member 32 and mounted in bearings such as 33, there is a clutch member 34 which is adapted to engage with the clutch member 32 for a purpose to be hereinafter described. A shaft 35 is keyed to the hub extension 36 of the clutch member 34, and is driven thereby, and this shaft 35 by means of a universal coupling 37, and a universal coupling 38, is connected to a shaft 39 to be hereinafter more specifically described.

The mechanism by which the clutch face 34 is caused to engage and disengage the clutch face 32, is illustrated in detail in Figs. 7 to 10, and referring to said figures, it will be seen that the bearing 33 in which the hub extension 36 of the clutch member 34 is mounted is preferably of the roller type. The bearing 33 is mounted in guides 40 carried by the rear wall 41 of a suitable frame 42 in which this mechanism is enclosed, and said bearing is adapted for sliding movement longitudinally of the guides 40. Carried by the bottom wall 43 of the housing 42, there is a block 44 and said block is movable along its bottom wall support by means of a screw or the like 45. Pivotally connected as at 46 to this block 44, there is a yoke 47 and said yoke 47 is pivotally connected as at 48 to the roller bearing 33. Carried by the upper end of the yoke 47, there is a roller 49 and also carried by the upper arms of the yoke 47, there is an arm 50 having a collar 51 which is slidably mounted upon a rod 52 mounted in brackets 53 carried by the top wall of the housing 42. The collar 51 is adapted to move towards the brackets 53, and in so doing is adapted to compress a spring 54 which is carried by the rod 52. The yoke 47 is movable about its pivotal point 46 by means of a wedge shaped member 55 which is forced between the roller 49, and a stationary roller 56 mounted in a suitable bracket 57. The wedge 55 is moved between the rollers 49 and 56 by means of a lever 58 which is pivotally mounted as at 59 in a bracket 60 on the rear wall 41 of the housing 42.

Thus it will be seen that as the lever 58 is rocked about its pivotal point 59, as for example by depressing the outer end thereof, the wedge shaped member 55 will be passed between the rollers 49 and 56, and the yoke 47 will be rocked about its pivotal point. As the yoke 47 is rocked about its pivotal point 46, the roller bearing 33 is moved in its housing 40, and the clutch member 34 is caused to move into gripping engagement with its clutch member 32. Movement of the yoke 47 about its pivotal point 46 places the spring 54 under compression, and the spring 54 serves to return the several parts to the normal position in which they are shown in Figs. 7 to 10 as soon as operating pressure is removed from the lever 58. As more clearly illustrated in Fig. 9, the lever 58 extends longitudinally of the automobile, and is provided at its rear end with an upstanding lever 61 which passes through the floor 62 of the vehicle adjacent the driver's seat 63 thereof. Mounted upon the upper end of the lever 61 there is a foot or heel piece 64 which is adapted to be engaged by the foot of the operator to depress the lever 61 and rock the lever 58 about its pivotal point 59. For returning the lever 58 to its original position, there is a spring 65 connected at one end to the lever and at the other end to the bracket 60 heretofore mentioned, and the lever 61 may be provided with a plurality of rack pieces 66 adapted to engage a plate 67 carried by the floor 62 to maintain the lever 58 in the depressed position.

By reference to Fig. 10, it will be noted that the lever 58 constitutes a frame like structure, and that the bracket 60 is of channel form with the pivot 59 constituting a rod or the like mounted in the side walls of the channel shaped bracket 60 and extending therebeyond to receive the side members of the frame like lever 58.

Secured to the frame 71 of the vehicle, by brackets 70 there is a housing 72 and the shaft 39 heretofore mentioned extends through this housing 72, and is mounted in suitable bearings 73. Mounted upon the shaft 39 within the housing 72, there is a sliding sleeve 74 which is keyed to the shaft 39 to rotate therewith, and said sleeve 74 has clutch members 75 and 76 upon the ends thereof. An offset partition 77 forms the means for supporting the forward bearings 73, and loosely mounted upon the shaft 39, there is a back pulley or the like 78 which operates behind the offset portion of the partition 77. The partition 77 also forms the means for supporting a floor or fan 79 and the shaft of the fan 79 is projected from the housing thereof as at 80, and carries a belt pulley 81, by means of which the shaft is driven through the medium of a belt 82 which passes around the pulleys 78 and 81. The fan is provided with an air intake 83 and an air discharge 84 and these air passages are provided with valves 85 and 86 respectively. The valve structure of these valves 85 and 86 is set forth in detail in Figs. 6 and 14 of the drawings, and by reference to Fig. 6 it will be noted that each of the valves comprises a housing 87 in which there is mounted a cylindrical valve member 88.

Each of the valve members 88 carries a gear 89 and meshing with the gears 89 there is a worm gear 90 which operates the gears 89 to turn their respective cylindrical valve members to open and close the various passages. Leading to the valve 85 there are two passages 91 and 92 which supply air to the valve 85. The passage 91 includes an extension pipe 93 which in turn is connected to a jacket 94 surrounding the exhaust pipe 17 of the motor. This jacket 94 and pipe 93 supply heated air from the region of the exhaust pipe to the intake valve 85. The passage 92 supplies cool air from the exterior of the vehicle to the valve 85, and it will be understood that either hot or cool air may be supplied to the blower through the valve 85 depending entirely upon the adjustment of said valve. As the air either cool or heated is passed through the blower 79, it is delivered to the valve 86 from whence it is discharged to either the exhaust pipe 96 or the exhaust pipe 97. As illustrated in Fig. 2, the exhaust pipe 96 which supplies the cool air to the interior of the vehicle for ventilating purposes, discharges into a system of piping such as 98 by means of which air is delivered into the rear and front compartments of the vehicle. Leading from the pipe 98 and passing beneath the front seat, there is a pipe 100 which delivers cool air to the forward compartment of the vehicle for ventilating purposes. When the valve 86 is adjusted to open the exhaust passage 97, heated air is delivered by means of the pipe 101 to a manifold 102 extending across the car at the base of the windshield and directly under the cowl 103. The manifold 102 is provided with a plurality of exhaust openings 104 which are covered by a shield 105 which in turn is operated by a threaded shaft 106 having a hand wheel 107 by means of which it may be rotated. As the hand wheel 107 is rotated, the shield 105 may be moved to open to close the discharge openings 104 in the manifold 102. A valve 105′ controls the flow of air through the pipe 101′.

Branching off from the pipe 101 as at 102', there is a pipe 103' which is connected to a pipe 100' which extends lengthwise of the vehicle, and discharges at 106' into the rear compartment of the car, and at 107' into the front or driver's compartment of the car. By this means, when the valve 86 is adjusted so that the fan 79 discharges heated air alone, both compartments of the vehicle will be heated.

As heretofore stated, the manifold 102 is positioned directly beneath the windshield, and in Fig. 15 the windshield is designated 108, and by reference to said Fig. it will be noted that the warm air discharged from the manifold 102 will be projected upwardly into direct contact with the outer face of the windshield 108. Presence of warm air upon the outer face of the windshield 108 will be effective to prevent freezing of liquids of condensation thereon during winter driving.

By reference to Fig. 17 of the drawings, it will be noted that the nozzles 99 heretofore mentioned each comprises a flared body portion 110, having a discharge opening 111 therein. Pivotally mounted as at 112 to the sides of the flared body portion 110, there is a distributing means 113 preferably in the form of a corrugated plate which extends transversely of the discharge end of the flared nozzles 99. In Fig. 19, there is illustrated a control for the discharge of the pipes 100 and 100' which convey the air beneath the front seat to the interior of the vehicle, and in said Fig. it will be noted that the ends of the several pipes 100 and 100' are connected to a channel member 117 at points designated 118 therein and at which points, there are openings through which the air may be discharged. Slidably mounted in the channel member 117, there is a damper like member 119 and this member may be moved across the openings 118 to entirely cut off the flow of air through said openings, or may be moved to position where it can only partially close said opening and thereby permits of a partial discharge of air from the several pipes 100 and 100'.

The worm 90 which operates the valves 85 and 86 is carried by a shaft 120 which in turn is mounted in brackets 121, see Fig. 18. The upper end of the shaft 120 projects through the floor boards 62 of the vehicle, and is provided with an operating handle 122. Beneath the floor boards of the vehicle, the shaft 120 is provided with a bevel gear 123 which meshes with a bevel gear 124 carried by a shaft 125 mounted in the housing and in a bracket 126. The forward end of this shaft is provided with a bevel gear 127 which meshes with a bevel gear 128 carried by a short shaft 129 mounted in the floor boards of the vehicle, and upon the upper end of which there is an operating handle 130. Thus it will be seen that by operation of either of the operating handle 122 or 130, the valves through the medium of the heretofore described driving mechanism will be adjusted to the desired position to cut off all supply of air, supply warm air, or supply cool air to the interior of the vehicle as occasion may require.

Extending across the housing 72 near its rear end, there is a partition 131, and mounted between this partition and the rear end wall of the housing 72, there is an exhausting fan 132. This fan has a shaft 133 on which is mounted a pulley 134 and passing around said pulley 134 and a pulley 135 mounted on the shaft 39, there is a driving belt 136. By this means the exhaust fan 132 is driven it being obvious that the pulley 135 has clutch face 137 with which the clutch face 76 of the sleeve 74 is adapted to engage to operatively connect the pulley 135.

The sleeve 74 heretofore described are movable longitudinally of the shaft 39 to operatively engage the clutch members 75 and 76 with their respective pulley clutches, is moved by a sliding yoke 140 the forked end of which engages a collar 141 carried by the sleeve 74. As thus shown in Fig. 11, the clutch collar 141 carries a spring 142 having a bowed portion 143. This bowed portion 143 is adapted to be received in one of a plurality of recesses designated 144, 145 and 146 in the shaft 39. Thus it will be seen that as the sleeve 74 is moved along the shaft 39 by reason of the projection 143 in engagement with any one of the recesses, the sleeve 74 will be maintained in position against movement longitudinally of the shaft 39.

The yoke member 140 is carried by a sliding plate 146 mounted in guides 147, and the rear end of the yoke member 140 projects through the side wall of the housing 72 as at 148. Connected as at 149 to this projecting end of the yoke member 140, there is a link 150 to the opposite end of which is connected a crank 160. The crank 160 is operatively associated with a ratchet wheel 151 upon the shaft 152 of which there is an operating handle 153 which carries a spring actuated pall 154 adapted to engage the teeth of the ratchet wheel 151. The handle 153 projects through an opening 155 in the instrument board or other suitable location on the vehicle, where it may be conveniently reached by the operator. The ratchet wheel 151 is provided with a plurality of teeth for engagement by the pall 154 and as the pall is engaged with the teeth, the crank 160 will be caused to make a series of complete revolution depending upon the number of times the pall is engaged with the several teeth. By this means, the sleeve 74 will be capable of movement along the shaft 39 to cause its clutch faces 75 and 76 to engage the respective clutch faces of the pulleys 78 and 135 and thereby selectively drive the fan 79 or the fan 132 as may be desired.

For maintaining the yoke member 140 in proper operating position on the sleeve 74, there is a locking mechanism which comprises two spring members 161 and 162 placed together and so shaped as to provide openings 163. The plate 146 is provided with a pin 147' which moves between the spring members 161 and 162 and is adapted to be received in the openings 163 and thereby maintain the yoke member out of engagement with the collar 141 during rotation of the sleeve 74.

The fan 132 heretofore mentioned, has an inlet pipe 170, and an exhaust pipe 171. As more clearly shown in Fig. 2, the inlet pipe 170 has a hose 175 attached thereto and upon the free end of said hose, there is a vacuum cleaning nozzle 176. The hose 175 and nozzle 176 may be of any design generally known and does not itself form any part of this invention. By this means it will be obvious that by operation of the fan 132, a vacuum cleaner for cleaning the upholstery of the car may be obtained, and that the air and dirt collected by the vacuum cleaner will be drawn in through the nozzle 176 the hose 175 and the intake 170 to the blower 132 and discharge beneath the car from the outlet 171 of the blower 132. The device operates in the following manner.

In Fig. 3, the several parts are shown in their idle or disconnected positions, and in such position of the parts, only the clutch shaft 19 is moving. If now the lever 24 be moved to cause engagement of the clutch faces 21 and 23, the sprocket 22 will be driven through the medium of said clutch, and through the medium of the silent chain 29 and the sprocket carried by the shaft 26, the shaft 26 and its clutch member 32 will be driven. If now the operating lever 58 be depressed, the clutch member 34 will be moved into engagement with the clutch member 32 and through the medium of its various connections, the shaft 39 will be driven, the sleeve member 74 having been previously moved as heretofore described to engage its clutch members 75 or 76 with the clutch member of the puley 78 or 135 depending upon which pulley it is desired to drive. If the pulley 78 is to be driven, the clutch member 75 will be engaged with the clutch member of said pulley and through the medium of the belt and the pulley 81, the shaft 80 will be driven and through the medium of said shaft the fan 79 will be set into operation. The valves 85 or 86 are operated to circulate through the ventilating system, the desired temperature either cool or heated as occasion may require. It is to be understood that while not absolutely necessary, it is desirable to adjust the sleeve 74 before the clutch members 32 and 34 have been operatively connected.

It is to be understood that the lever 58 is located adjacent the foot accelerating pedal of the motor and it is intended that in the case of ventilation with cool air when it is desired to circulate the cool air through the body of the vehicle as for example when the vehicle is standing in traffic in hot weather, it is only necessary for the operator of the vehicle when he removes his foot from the accelerating pedal to place it upon the foot piece 64 and depress the lever and immediately circulation of cool air begins. As the car gets under way from its position in traffic, and the operator moves his foot from the depression of the lever 58 onto the foot accelerator again to accelerate his motor, the circulation of cool air is cut off but the car being under motion said circulation of cool air is a natural one and a forced circulation is no longer required. Again when the vehicle is detained in traffic, the operation is repeated.

Thus it will be seen that by reason of the construction provided by the present invention, it is possible in hot weather to provide for a ventilating and circulation of air through the interior of a closed vehicle when the vehicle is standing still and further, the mechanism provides means whereby this forced circulation of air and ventilation of the interior of the vehicle may be cut off when such result is obtained by natural drafts as a result of movement of the vehicle through the air.

When it is desired to use the device as a vacuum cleaner, it is only necessary to shift the sleeve 74 until its clutch member 76 engages the clutch member 137 when through the medium of the pulley 135 belt 136 and pulley 134, the exhaust fan 132 will be driven to provide the vacuum cleaner.

While the device has been herein illustrated in what is considered at the present time a preferred form of the invention, it is to be understood that the invention is not limited to the specific constructions, and arrangements of parts herein illustrated, but that it is quite capable of other adaptations than that shown, and is to be limited only by the scope of the claims appended hereto.

Having thus described my invention, what I claim as new, and desire to secure by United States Letters Patent is:—

1. A mechanical ventilating system for motor vehicles, comprising air impelling means, manual controlled means for driving said air impelling means, means for supplying cool air to said impelling means, separate means for supplying heated air to said impelling means, a valve for selectively controlling the supply of either cool or heated air to said impelling means, means for discharging cool air from said impelling means, separate means for discharging heated air from said impelling means, a second valve for selectively controlling the discharge of either cool or heated air from said impelling means, means for manually operating both of said valves in unison whereby they will be simultaneously adjusted to produce a current of air from said impelling means of any temperature ranging between that of the cool air supply and that of the heated air supply for ventilating purposes, means for conveying the air from the said impelling means to the interior of the body of the vehicle, said last mentioned means including tubes concealed in the body structure of the vehicle and terminating at various points in the interior of the vehicle body, and means at the terminating outlet ends of said tubes for distributing the discharge of air therefrom and for directing its course.

2. A mechanical ventilating system for motor vehicles, comprising an air impelling means, means for driving said impelling means, means for supplying cool air to said impelling means, separate means for supplying heated air to said impelling means, a valve for selectively controlling the supply of either cool or heated air to said impelling means, means for discharging cool air from said impelling means, separate means for discharging heated air from said impelling means, a second valve for selectively controlling the discharge of either cool or heated air from said impelling means, means for manualy operating both of said valves in unison whereby they will be simultaneously adjusted to produce a current of air from said impelling means of any temperature ranging between that of the cool air supply and that of the heated air supply for ventilating purposes, means for conveying the air from the impelling means to the interior of the body of the vehichle, said last mentioned means including tubes concealed in the body structure of the vehicle and terminating at various points in the interior of the vehicle body, and means at the terminating outlet ends of said tubes for distributing the discharge of air therefrom and for directing its course, said means for driving said impelling means includes a manually movable pedal.

3. A mechanical ventilating system for motor vehicles, comprising a blower, means for driving said blower from the motor of the vehicle, means for supplying cool air to said blower, separate means for supplying heated air to said blower, a valve for selectively controlling the supply of either cool or heated air to said blower, means for discharging cool air from said blower, separate means for discharging heated air from said blower, a second valve for selectively controlling the discharge of either cool or heated air from said blower, means for manually operating both of said valves in unison whereby they will be simultaneously adjusted to produce a current of air from said blower of any temperature ranging between that of the cool air supply and that of the heated air supply for ventilating purposes, means for conveying the air from the blower to the interior of the body of the vehicle, said last mentioned means including tubes concealed in the body structure of the vehicle and terminating at various points in the interior of the vehicle body, and means at the terminating outlet ends of said tubes for distributing the discharge of air therefrom and for directing its course, said means for driving said blower from the motor of the vehicle includes a clutch manually operable by a foot pedal.

4. A mechanical ventilating system for motor vehicles, comprising a blower, means for driving said blower from the motor of the vehicle, means for supplying cool air to said blower, separate means for supplying heated air to said blower, a valve for selectively controlling the supply of either cool or heated air to said blower, means for discharging cool air from said blower, separate means for discharging heated air from said blower, a second valve for selectively controlling the discharge of either cool or heated air from said blower, means for manually operating both of said valves in unison whereby they will be simultaneously adjusted to produce a current of air from said blower of any temperature ranging between that of the cool air supply and that of the heated air supply for ventilating purposes, means for conveying the air from the blower to the interior of the body of the vehicle, said last mentioned means including tubes concealed in the body structure of the vehicle and terminating at various points in the interior of the vehicle body, and means at the terminating outlet ends of said tubes for distributing the discharge of air therefrom and for directing its course, said means for supplying cool air to said blower comprises piping connected with the exterior.

5. A mechanical ventilating system for motor vehicles, comprising a blower, means for driving said blower from the motor of the vehicle, means for supplying cool air to said blower, separate means for supplying heated air to said blower, a valve for selectively controlling the supply of either cool or heated air to said blower, means for discharging cool air from said blower, separate means for discharging heated air from said blower, a second valve for selectively controlling the discharge of either cool or heated air from said blower, means for manually operating both of said valves in unison whereby they will be simultaneously adjusted to produce a current of air from said blower of any temperature ranging between that the cool air supply and that of the heated air supply for ventilating purposes, means for conveying the air from the blower to the interior of the body of the vehicle, said last mentioned means including tubes concealed in the body structure of the vehicle and terminating at various points in the interior of the vehicle body, and means at the terminating outlet ends of said tubes for distributing the discharge of air therefrom and for directing its course, said separate means for supplying heated air to said blower includes piping passing in the vicinity of the motor of the vehicle to receive heat.

In testimony whereof I have affixed my signature.

GEORGE F. HENRY.